United States Patent [19]
Pirhonen

[11] Patent Number: 5,165,750
[45] Date of Patent: Nov. 24, 1992

[54] TRUCK BED COVER

[76] Inventor: Ilkka J. Pirhonen, 4310 Via Marina, #D, Marina del Rey, Calif. 90292

[21] Appl. No.: 779,624

[22] Filed: Oct. 21, 1991

[51] Int. Cl.⁵ ............................................... B60P 7/02
[52] U.S. Cl. .................................... 296/100; 296/43
[58] Field of Search ............. 296/100, 43; 160/327, 160/328, 378

[56] References Cited

U.S. PATENT DOCUMENTS

| | | | |
|---|---|---|---|
| 4,036,521 | 7/1977 | Clenet | 296/100 |
| 4,444,427 | 4/1987 | Martin | 296/43 |
| 4,639,033 | 1/1988 | Wheatley et al. | 296/100 |
| 4,730,866 | 3/1988 | Nett | 296/100 |
| 4,815,787 | 3/1989 | Hale | 296/43 |

Primary Examiner—Robert R. Song
Attorney, Agent, or Firm—Roger A. Marrs

[57] ABSTRACT

A cover for a truck bed is disclosed herein having a base secured to the edge of the truck bed which includes a pair of side bars connected at their ends by front and rear bars. A flexible sheet of cover material is detachably connected to the respective bars by fasteners cooperatively aligned and placed about the peripheral edge marginal region of the cover and the respective bars. The base is releasably carried on the truck bed by clamps, latches or the like.

1 Claim, 2 Drawing Sheets

TRUCK BED COVER

BACKGROUND OF THE INVENTION

1. Field of the Invention

The present invention relates to the field of protective covers, and more particularly to a novel protective cover detachably secured to a base or frame that is fixedly secured to the top edge or rail of the bed of a truck.

2. Brief Description of the Prior Art

In the past, most truck beds have been left open so that they expose the contents, such as tools, work materials, articles being transported or the like. Such items are subject to damage because of weather or to theft since it is easy to reach into the truck bed and remove contents. Some attempts have been made to cover a truck bed, which usually take the form of enclosures that are mounted onto the truck bed which are rigid and are generally employed for accommodating benches on which passengers can ride or which will permit a person to climb into the truck bed and peruse the contents thereof.

Problems and difficulties have been encountered with such so-called "camper" shells that stem largely from the fact that they are extremely expensive and require substantial modification to the walls of the truck bed to accommodate installation. In other instances where foldable covers have been employed, special holes are required for bolting the anchor portions of the cover to the truck bed itself. Such a procedure requires drilling tools and the necessity of actual drilling operations. When the cover has been removed, such holes are seen, which destroys the overall look and visual appeal of the vehicle.

Therefore, a long-standing need has existed to provide a relatively inexpensive truck bed cover which may be installed on the truck bed by inexperienced persons without the use of special tools and which will not mar, damage or require modification of the conventional truck bed.

SUMMARY OF THE INVENTION

Accordingly, the above problems and difficulties are obviated by the present invention which provides a novel cover for a conventional truck bed which employs a rigid frame mountable along the edge marginal region of the truck bed sidewalls by means of a latch or block and screw arrangement that avoids modification of the truck bed. A flexible cover sheet is detachably connected about its peripheral edge to the base frame by fastener means so that the cover sheet will cover the open truck bed in its operative position and which may be disconnected and folded or rolled into a storage position. In one form, the fastener means may be snap-lock button and receptacle combinations wherein the button may be carried on the edge of the cover sheet while the receptacle for the button may be fixedly attached to the rigid frame so that upon alignment of the button with the receptacle, snap-lock connection can be taken. The frame and cover are light in weight and may be produced from inexpensive materials, such as plastic and recycled materials.

Therefore, it is among the primary objects of the present invention to provide a novel cover for a truck bed which includes a base detachably connected to the truck bed for carrying a cover over the open part of the truck bed which is inexpensive and convenient to install by unskilled persons.

Another object of the present invention is to provide a novel cover for a truck bed which permits installation without any drilling, gluing or damaging the truck body or the paint.

Yet another object of the present invention is to provide a novel pickup truck tonneau cover which may be fastened over a frame or base by snap fasteners or Velcro tape so that the cover may be readily removed at the convenience of the user from the frame.

Another object of the present invention is to provide a novel cover for installation over an open truck bed which includes a cast frame detachably connectable to the edge marginal region of the truck bed by latch or block and screw couplers and which includes a cover sheet detachably connectable to the frame by snap fasteners or Velcro tape.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
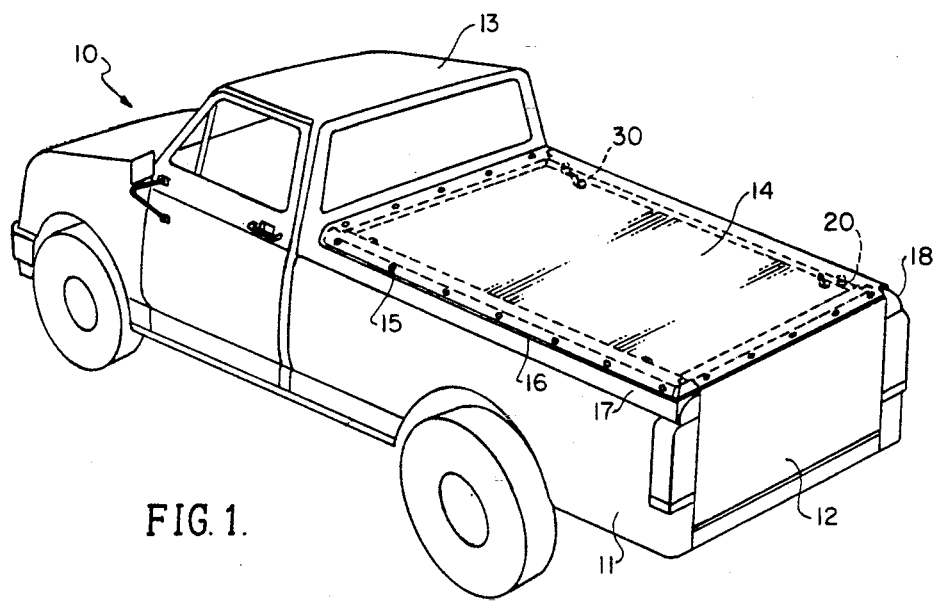
FIG. 1 is a rear perspective view of a conventional pickup truck having a truck bed covered by the inventive truck bed cover.

Referring to FIG. 1, a conventional pickup truck is illustrated in the general direction of arrow 10, which includes a truck bed 11 having a tailgate 12, and it can be seen that the truck bed is aft of a cabin 13 occupied by the driver and passengers. As in the conventional vehicle, the truck bed has an opening between the sidewalls and the tailgate and cabin over which the inventive cover of the present invention is disposed.

The inventive cover for the truck bed includes a flexible sheet 14 of material which is drawn tightly over the truck bed opening by utilizing a plurality of fasteners, such as snap-lock fasteners 15 carried about the edge of the cover sheet 14 and cooperating with fastener closures carried on a base 16. It is to be understood that the securement means for the edge of the cover with the base 16 may be in the form of buttons which snap onto receptacles or may be of the 2-piece Velcro type closure. Also, it is noted that the fastening means associated with the front of the base 16 may be placed on top of the base as illustrated or may be placed along the front side of the base. This is an optional arrangement since the truck bed 11 may be so close to the cabin 13 that no room is permitted for closing the fasteners if the fasteners were on the front side of the base. However, by placing the fasteners along the top of the front of the base 16, the fasteners may be readily utilized for installing or removing the cover.

It is also noted that the truck bed includes a railing 17 and 18 flaring outwardly from the upper end of each sidewall of the bed 11. As is the usual practice, the railing includes a pair of openings near the tailgate 12 and a pair of front opening in the rails 17 and 18 near the cabin 13. The base 16 includes front and rear guides, such as guide 20, which downwardly depend from the underside of the side bars of the base and when aligned with the respective pairs of holes or openings in the rails 17 and 18, permits the base to be installed flush on the top of the rails.

Figure 2:
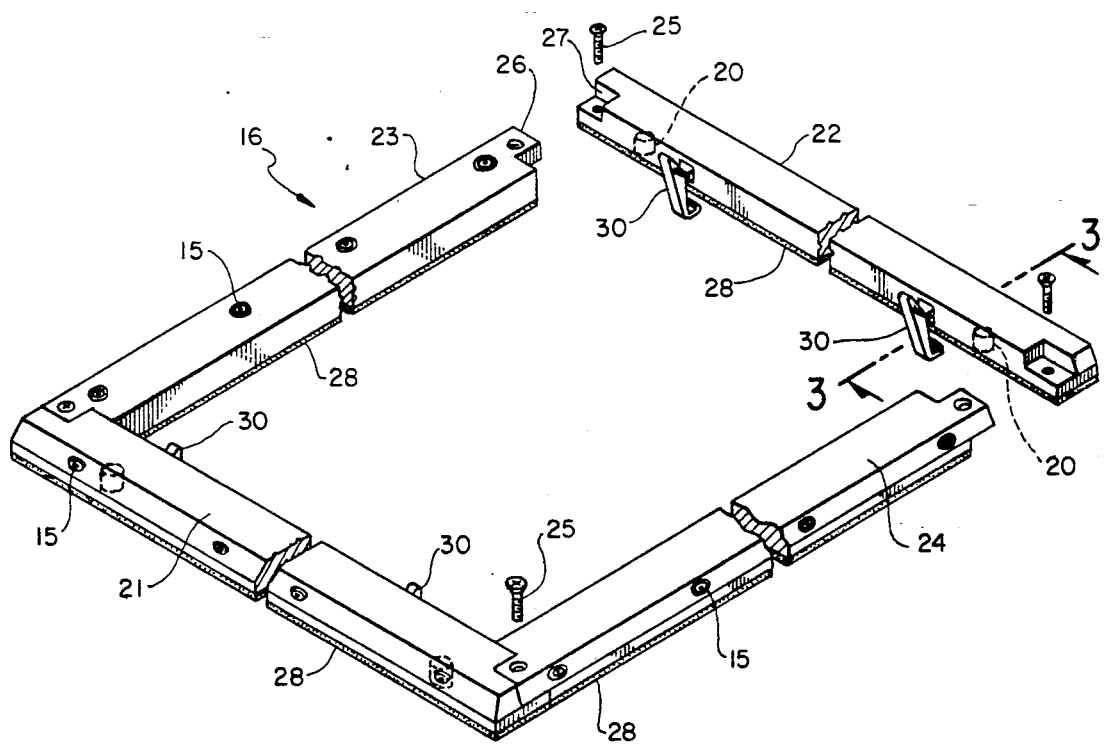
FIG. 2 is a perspective view of the base or frame employed in the truck bed cover shown in FIG. 1.

Referring now in detail to FIG. 2, an exploded view of the base is illustrated which includes a pair of side bars 21 and 22 which are secured at their opposite ends to a front bar 23 and a rear bar 24. The front bar is intended to lie against the cabin 13 while the rear bar 24 will permit closure of the tailgate 12. The respective ends of the side bar and the front and rear bars are connected together by a screw, indicated by by numeral 25, which passes through an outwardly extending shoulder 26 that is mated with a cutout 27 in the corner of the front or rear bar to which it is attached. Each corner of the base includes the cutout 27 which is occupied by the projection 26. When properly in alignment, holes in both the projection and the shoulder defining the cutout will receive the screw or bolt 25.

The respective fasteners 15 taking the form of the receptacles are screwed into position along the side of the side bars 21 and 22. The fastener receptacles are also screwed in fixed spaced-apart position along the side of the rear bar 24. However, as previously described, the fastener portions 15 are placed along the top of the front bar 23. These may be placed along the front of the front bar, if desired, or, the front edge of the cover 14 may be permanently installed along the front bar 23.

It is also to be noticed that cushion material 28 is placed on the underside of the base along the underside of each bar so that the frame or base 16 will not mar or damage the rails or any portion of the truck bed on which the base is mounted. The side bars 21 and 22 further include a clamping means taking the form of pivoting latches, such as indicated by numeral 30 which, when open, permit the latch to grasp the edge of the rail so that when pivoted, a gripping connection occurs to hold the base in position on the rails. As illustrated, four latches are employed. Also, it can be seen in FIG. 2 that the guides 20 are carried on the underside of each of the respective side rails 21 and 22 and that they downwardly project therefrom through the cushion material for insertion into the rail openings during initial installation of the base.

Figure 3:
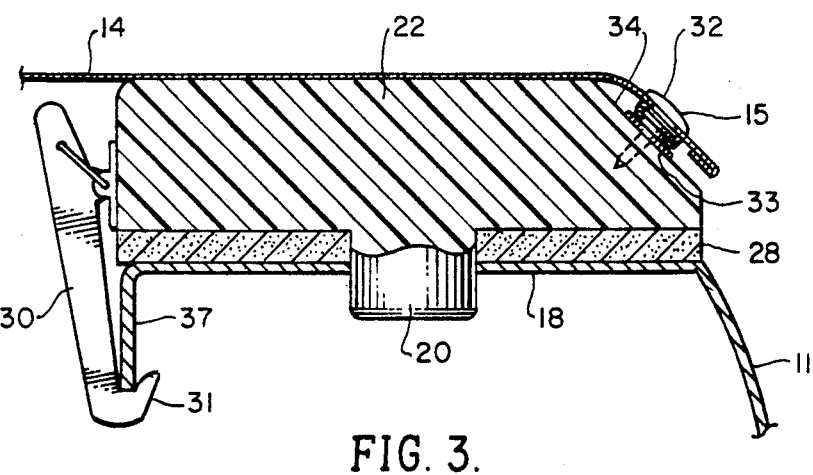
FIG. 3 is an enlarged transverse cross-sectional view of the truck bed cover installation on the edge marginal region of the truck bed.

Referring now in detail to FIG. 3, the pivoting latch 30 is more clearly illustrating which includes a hook portion at one end of the latch, as indicated by numeral 31, which is illustrated as being in a clamping position with the edge of rail 18. Also, it can be seen that the guide 20 is integrally formed with the underside of the side bar 22 and that it projects downwardly through an opening in the rail 18. The cushion material 28 separates the underside of the bar from the rail 18. The fastener 15 is illustrated in its closed position to hold the edge of the cover sheet 14 taut across the base. The fastener 15 includes the button 32 attached to the edge of the cover, while the receptacle, indicated by numeral 33, is screwed into attachment with the chamfered surface 34 of the side bar.

Figure 4:
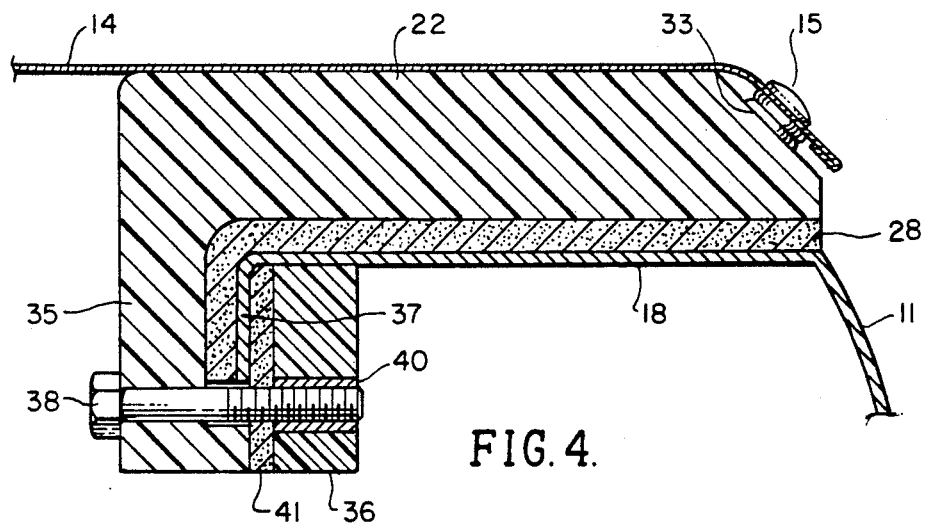
FIG. 4 is a view similar to the view of FIG. 3 illustrating another means for detachably mounting the frame and cover of the invention to the truck bed rail.

Referring now in detail to FIG. 4, another version of the invention is illustrated for releasably holding the base in operative position on the rail 18. This means includes a downwardly depending portion 35 integrally formed on the inner edge marginal region of each side rail, such as side rail 22. A block 36 is included and is placed against the inner side of rail 18 and more specifically, against the downwardly depending flange 37 of the rail. A bolt 38 is inserted through an opening in the portion 35 and beneath the side rail lip 37 so as to be received within a threaded element 40 carried on the block 36. Therefore, as the bolt is turned, the block is drawn into securement with the flange 37. The cushion material 28 is extended along the inside of portion 35 and insulation 41 is included between the block 36 and the flange 37.

Figure 5:
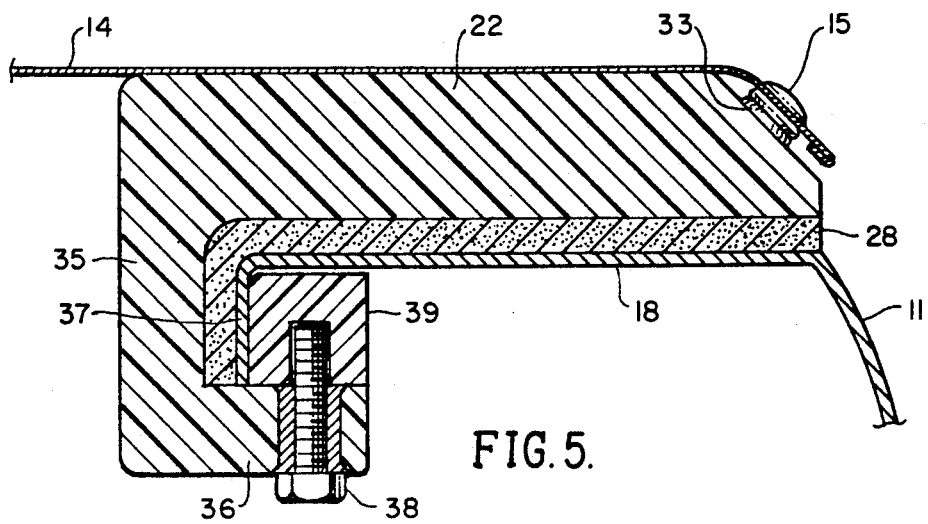
FIG. 5 is a view similar to the view of FIG. 4 illustrating another means for removably attaching the inventive cover and frame to the truck bed.

Yet another clamping means is illustrated in FIG. 5 which includes the flange 35 downwardly depending from the inside of side rail 22 and which terminates in a block element 36 through which a bolt 38 is threadably passed. The end of the bolt is in threaded engagement with a block 39 disposed against the lip 37 of the rail 18. By employing the version of clamp shown in FIGS. 3, 4 and 5 no holes or other modifications are required to the flange 37.

In view of the foregoing, it can be seen that a novel means is provided for covering the opening on a conventional truck bed, such as the bed of a pickup truck. The initial installation requires the clamping of the base to the rail along the upper edge marginal region of the truck bed and clamping of the base to the rail is achieved after the proper alignment of the guide 20 with the opening in the rail. The cushion material prevents damage and the variety of clamping attachment means may take the form of the latch 30, block 36 and/or block 38.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a removable cover for a truck bed having a bed rail, the combination comprising:

a base disposed on said truck bed on said bed rail;

clamping means releasably coupling said base to the truck bed;

a cover sheet disposed over said base;

fastener means detachably connecting said cover sheet to said base;

said base is a frame having parallel side bars joined by a front and a rear bar at the opposite ends of said side bars;

guide means downwardly depending from said side bars;

said clamping means includes a block cooperative with a base member to clamp against said truck bed rail; and selected ones of said fastener means are on top of said base and the others are disposed on the side of said base.

* * * * *